(12) United States Patent
Shen et al.

(10) Patent No.: US 12,446,009 B2
(45) Date of Patent: Oct. 14, 2025

(54) RESOURCE INDICATION METHOD AND COMMUNICATIONS DEVICE

(71) Applicant: ViVO MOBILE COMMUNICATION CO., LTD., Dongguan (CN)

(72) Inventors: Xiaodong Shen, Dongguan (CN); Dajie Jiang, Dongguan (CN); Xueming Pan, Dongguan (CN); Kai Wu, Dongguan (CN); Lei Ge, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 477 days.

(21) Appl. No.: 17/959,266

(22) Filed: Oct. 3, 2022

(65) Prior Publication Data

US 2023/0024526 A1    Jan. 26, 2023

Related U.S. Application Data

(63) Continuation of application No. PCT/CN2021/084442, filed on Mar. 31, 2021.

(30) Foreign Application Priority Data

Apr. 7, 2020  (CN) .......................... 202010266529.3

(51) Int. Cl.
*H04W 72/04*  (2023.01)
*H04W 24/08*  (2009.01)
(Continued)

(52) U.S. Cl.
CPC ........... *H04W 72/04* (2013.01); *H04W 24/08* (2013.01); *H04W 52/0235* (2013.01); *H04W 68/005* (2013.01)

(58) Field of Classification Search
CPC . H04W 72/04; H04W 24/08; H04W 52/0235; H04W 68/005; H04W 76/28;
(Continued)

(56) References Cited

U.S. PATENT DOCUMENTS 11,166,237 B2 * 11/2021 Selvaganapathy ..........................
H04W 52/0235
11,290,904 B2 * 3/2022 Chen ..................... H04W 68/02
(Continued)

FOREIGN PATENT DOCUMENTS

CN     109495924 A    3/2019
CN     109511132 A    3/2019
(Continued)

OTHER PUBLICATIONS

International Search Report issued in corresponding International Application No. PCT/CN2021/084442, mailed Jun. 28, 2021, 4 pages.
(Continued)

*Primary Examiner* — Brian T O Connor
(74) *Attorney, Agent, or Firm* — IPX PLLC (57) ABSTRACT

A resource indication method and a communications device are provided. The resource indication method includes: detecting a wake-up signal; and determining configuration information of a target resource based on the wake-up signal, where the target resource includes at least one of a measurement resource and a paging resource.

18 Claims, 4 Drawing Sheets

```
┌─────────────────────────────────────────┐
│                                         │  101
│       Detect a wake-up signal           │
│                                         │
└─────────────────────────────────────────┘
                    │
                    ▼
┌─────────────────────────────────────────┐
│                                         │  102
│ Determine configuration information of  │
│ a target resource based on the wake-up  │
│                signal                   │
└─────────────────────────────────────────┘
```

(51) Int. Cl.
*H04W 52/02* (2009.01)
*H04W 68/00* (2009.01)

(58) Field of Classification Search
CPC ..... H04W 52/02; H04W 68/02; H04W 24/02; Y02D 30/70
See application file for complete search history.

(56) References Cited

U.S. PATENT DOCUMENTS

| | | | |
|---|---|---|---|
| 11,363,563 B2* | 6/2022 | Pan | H04W 72/23 |
| 11,991,637 B2* | 5/2024 | Selvaganapathy | H04W 52/0229 |
| 12,156,136 B2* | 11/2024 | Ye | H04J 13/0029 |
| 12,207,120 B2* | 1/2025 | Miao | H04L 5/0048 |
| 12,219,489 B2* | 2/2025 | Shen | H04W 52/0235 |
| 12,225,463 B2* | 2/2025 | Jiang | H04W 68/005 |
| 2016/0128128 A1* | 5/2016 | Ang | H04W 76/28 370/311 |
| 2019/0239189 A1 | 8/2019 | Hwang et al. | |
| 2020/0275296 A1* | 8/2020 | Chen | H04W 24/08 |
| 2020/0359324 A1* | 11/2020 | Selvaganapathy | H04W 68/005 |

FOREIGN PATENT DOCUMENTS

| | | |
|---|---|---|
| CN | 110035482 A | 7/2019 |
| CN | 110167107 A | 8/2019 |
| CN | 110167128 A | 8/2019 |
| CN | 110351815 A | 10/2019 |
| CN | 110958672 A | 4/2020 |
| IN | 111328458 A | 6/2020 |
| WO | 2019101539 A1 | 5/2019 |

OTHER PUBLICATIONS

First Office Action issued in related Chinese Application No. 202010266529.3, mailed Jan. 26, 2022, 8 pages.
Second Office Action issued in related Chinese Application No. 202010266529.3, mailed Jul. 6, 2022, 6 pages.

* cited by examiner

FIG. 6

RESOURCE INDICATION METHOD AND COMMUNICATIONS DEVICE

CROSS-REFERENCE TO RELATED APPLICATIONS

This application is a continuation of International Application No. PCT/CN2021/084442, filed on Mar. 31, 2021, which claims priority to Chinese Patent Application No. 202010266529.3, filed on Apr. 7, 2020. The entire contents of each of the above-identified applications are expressly incorporated herein by reference.

TECHNICAL FIELD

The present disclosure relates to the field of communications technologies, and in particular, to a resource indication method and a communications device.

BACKGROUND

Currently, in a wireless communications system, when a terminal needs to perform measurement and/or paging, there may be a plurality of measurement resources and/or paging resources for the terminal to select. The plurality of measurement resources and/or paging resources are usually directly indicated by a network device via resource indication signaling or configuration information. However, such method for indicating resources may cause low efficiency of corresponding measurement and/or paging.

SUMMARY

Embodiments of the present disclosure provide a resource indication method and a communications device.

According to a first aspect, an embodiment of the present disclosure provides a resource indication method, including:
  detecting a wake-up signal; and
  determining configuration information of a target resource based on the wake-up signal, where the target resource includes at least one of a measurement resource and a paging resource.

According to a second aspect, an embodiment of the present disclosure provides a resource indication method, including: sending a wake-up signal.

The wake-up signal is used to indicate configuration information of a target resource, and the target resource includes at least one of a measurement resource and a paging resource.

According to a third aspect, an embodiment of the present disclosure provides a resource indication apparatus, including:
  a detecting module, configured to detect a wake-up signal; and
  a first determining module, configured to determine configuration information of a target resource based on the wake-up signal, where the target resource includes at least one of a measurement resource and a paging resource.

According to a fourth aspect, an embodiment of the present disclosure provides a resource indication apparatus, including:
  a sending module, configured to send a wake-up signal.
  The wake-up signal is used to indicate configuration information of a target resource, and the target resource includes at least one of a measurement resource and a paging resource.

According to a fifth aspect, an embodiment of the present disclosure provides a communications device, including a memory, a processor, and a computer program stored in the memory and capable of running on the processor, where when the computer program is executed by the processor, the steps of the foregoing resource indication method are implemented.

According to a sixth aspect, an embodiment of the present disclosure provides a computer-readable storage medium, where the computer-readable storage medium stores a computer program, and when the computer program is executed by a processor, the steps of the foregoing resource indication method are implemented.

BRIEF DESCRIPTION OF DRAWINGS

The following describes the accompanying drawings. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes the embodiments of the present disclosure.

In a wireless communications system, for example, 5G New Radio (NR) system, in a connected state, for example, a Radio Resource Control (RRC) connected state, a terminal can learn whether the terminal needs to wake up to receive a service from a base station in a subsequent period (for example, a next Discontinuous Reception (DRX) cycle) or go to sleep, by detecting a Physical Downlink Control CHannel (PDCCH) based power saving signal or channel.

In some embodiments, the power saving signal or channel used to wake up the terminal may also be called Wake-Up Signal (WUS). The power saving signal or channel used to make the terminal go to sleep may also be called Go-to-Sleep signal. In addition, in some cases, a wake-up signal is one kind of power saving signal or channel In other cases, a wake-up signal and a power saving signal or channel are conceptually indistinguishable, and are collectively referred to as a WUS.

In order to save power, when a terminal is in an idle (IDLE) state, the terminal can introduce a wake-up signal to indicate whether the terminal needs to wake up later to perform corresponding operations.

Figure 1:
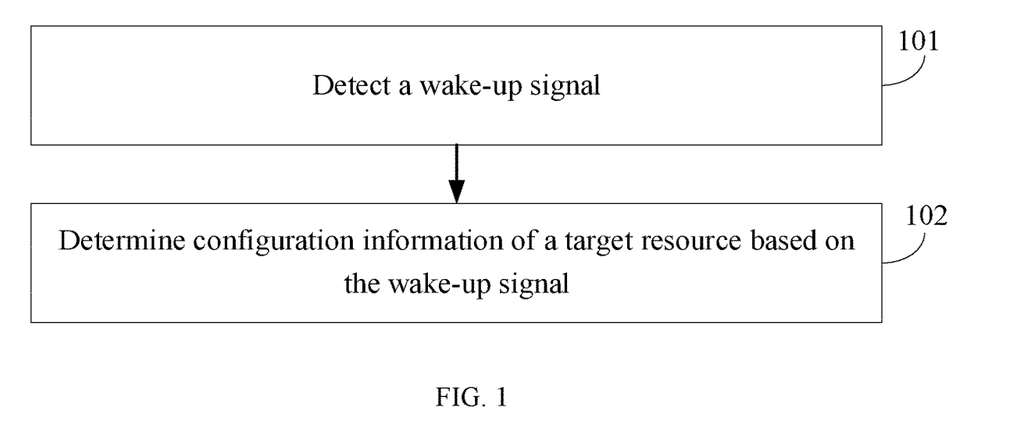
FIG. 1 is a flowchart of a resource indication method according to an embodiment of the present disclosure.

Referring to FIG. 1, FIG. 1 is a flowchart of a resource indication method according to embodiments of the present disclosure. The method is applied to a communications device. As shown in FIG. 1, the method includes the following steps.

Step 101: Detect a wake-up signal.

It should be noted that the use of the resource indication method in the embodiments may not be limited in communication between a network device (for example, a base station) and a terminal (for example, User Equipment (UE)), but may also be applied in communication between any sending apparatus and receiving apparatus, for example, between a sending terminal and a receiving terminal in a scenario of vehicle to everything.

In the embodiments, the execution subject which is a communications device may be a terminal communicating with a base station, a terminal communicating with another terminal, or a certain type of network device, which is not limited.

Using a case in which the execution subject in the embodiments is UE as an example, when the UE detects a wake-up signal, the UE may be in a connected state or an idle state. The manner in which the UE detects the wake-up signal is to receive the wake-up signal from a base station by checking a PDCCH.

Step 102: Determine configuration information of a target resource based on the wake-up signal.

In this embodiment, the target resource may include at least one of a measurement resource and a paging resource. The measurement resource may be called an additional measurement resource, and may be different from a directly configured measurement resource. The paging resource may be called an additional paging resource, and may be different from a directly configured paging resource.

The measurement resource and/or the paging resource may be pre-configured or pre-defined. For example, a time-frequency position and/or a DRX cycle of the measurement resource may be obtained by being pre-configured or pre-defined by a network device.

In an embodiment, the additional measurement resource may be a measurement resource based on a Synchronization Signal and Physical Broadcast CHannel (PBCH) Block (SSB) for performing SSB measurement, or may be also be a measurement resource of a Channel State Information Reference Signal (CSI-RS) for performing a CSI-RS measurement. The additional measurement resource is not limited herein. After it is determined that the additional measurement resource exists in the configuration information, a corresponding measurement may be performed. After it is determined that the additional paging resource exists in the configuration information, a corresponding paging may be performed.

The resource indication method in this embodiment of the present disclosure is able to detect a wake-up signal and determine configuration information of a target resource based on the wake-up signal. The target resource includes at least one of a measurement resource and a paging resource. Therefore, the wake-up signal may be associated with the measurement resource and/or paging resource, thereby making the corresponding measurement and/or paging more efficient and energy-saving.

In this embodiment of the disclosure, the process of determining the configuration of the target resource in Step 102 may be: in a case that the wake-up signal indicates wake-up, determining that the target resource exists in the configuration information; in some embodiments, in a case that the wake-up signal indicates non wake-up, determining that the target resource does not exist in the configuration information. Therefore, that whether the wake-up signal indicated wake-up implicitly indicates whether the target resource exists in the configuration information, thereby reducing signaling overhead.

It should be noted that the wake-up signal in this embodiment may include an indication field for indicating whether the target resource exists (for example, 1 bit, a value of 1 means that the target resource exists, and a value of 0 means that the target resource does not exist) in the configuration information, or may not include the indication field for indicating whether the target resource exists in the configuration information. In this case, for example, an indication field for indicating wake-up or non wake-up included in the wake-up signal may be used to implicitly indicate whether the target resource exists in the configuration information. In some embodiments, the wake-up signal in this embodiment includes an indication field for indicating whether the target resource exists in the configuration information, and may or may not include an indication field for indicating wake-up or non wake-up. The two kinds of indications may be performed in two independent indication fields or may be performed by jointly encoding.

In some embodiments, the process of determining configuration information of a target resource may also include any one of the following:

(1) based on the wake-up signal, determining whether the target resource exists in the configuration information.

In (1), whether the target resource exists in the configuration information may be determined based on the indication field included in the wake-up signal for indicating whether the target resource exists (for example, 1 bit, a value of 1 means that the target resource exists, and a value of 0 means that the target resource does not exist) in the configuration information.

(2) Based on the wake-up signal, a resource indicated by a first measurement resource configuration is determined as the target resource. The first measurement resource configuration is one of a plurality of measurement resource configurations, and is indicated by the wake-up signal. For example, a resource indicated by the first measurement resource configuration may be within an indication period of the wake-up signal.

In (2), the target resource may be determined based on the indication field included in the wake-up signal for indicating a location of the target resource.

In an embodiment, the plurality of measurement resource configurations may be pre-configured or pre-defined. For example, the plurality of measurement resource configurations may be notified to a terminal by a network device, for example, a base station, by using a RRC message.

(3) Based on the wake-up signal, it is determined that the target resource exists in the configuration information, and the resource indicated by the first measurement resource configuration is determined as the target resource. The first measurement resource configuration is one of a plurality of measurement resource configurations, and is indicated by the wake-up signal. For example, a resource indicated by the first measurement resource configuration may be within an indication period of the wake-up signal.

In an embodiment, the plurality of measurement resource configurations may be pre-configured or pre-defined. For example, the plurality of measurement resource configurations may be notified to a terminal by a network device, for example, a base station, by using a RRC message.

In (3), the wake-up signal may include two indication fields, for example, a first indication field and a second indication field. The first indication field is used to indicate whether the target resource exists in the configuration information and the second indication field is used to indicate a location of the target resource. In this way, when the first indication field indicates that the target resource exists in the configuration information, the location of the target resource may be indicated with the help of the second indication field.

In some embodiments, if the determined configuration of the target resource is that the target resource exists in the configuration information, the pre-configured resource may also be determined as target resources in this embodiment. The pre-configured resource may be pre-configured by the network device. In this way, it may be avoided that the target resource is indicated separately, thereby saving signaling overhead.

In some embodiments, in addition to a set of additional measurement resources, the terminal may also have a set of pre-configured measurement resources (different from the additional measurement resources). The two sets of measurement resources may be SSB-based measurement resources and CSI-RS-based measurement resources, or a mixture of the two, that is, each set of measurement resources includes SSB-based measurement resources and CSI-RS-based measurement resources.

In an embodiment, the terminal receives a network configuration and determines a set of measurement resources, and the terminal dynamically determines an additional measurement resource based on indication of WUS. The determining an additional measurement resource includes determining whether the additional measurement resource exists within a WUS indication period, or determining the use of a plurality of additional measurement resources within the WUS indication period. The WUS indication period may be one DRX cycle, a plurality of DRX cycles, a paging cycle or a plurality of paging cycles.

In some embodiments, after the configuration information of the target resource is determined, the communications device can perform corresponding measurement and/or paging on the target resource. For example, if the additional measurement resource is an SSB-based measurement resource, SSB measurement may be performed on the measurement resource. In some embodiments, if the additional measurement resource is a CSI-RS measurement resource, a CSI-RS measurement may be performed on the measurement resource.

In this embodiment of the disclosure, in a case that the wake-up signal is not detected on the pre-configured resource, the communications device, for example, the terminal may also determine the configuration information of the target resource according to any one of the following:

pre-configured information, for example, the pre-configured information is RRC signaling received by the terminal from the base station in advance, where the RRC signaling may indicate that the additional measurement resource (or the paging resource) exists, or that the additional measurement resource (or the paging resource) does not exist; in some embodiments, the RRC signaling may indicate that in a case that the wake-up signal is not detected on the pre-configured resource, the additional measurement resource (or the paging resources) does not exist, or the additional measurement resource (or the paging resources) exists; and a pre-defined rule, for example, the pre-defined rule is that in a case that the wake-up signal is not detected on the pre-configured resources, the additional measurement resource (or the paging resource) does not exist; in some embodiments, in a case that the wake-up signal is not detected on the pre-configured resource, the additional measurement resource (or the paging resource) exists.

In some embodiments, in a case that the wake-up signal is not detected on the pre-configured resource, the communications device, for example, the terminal may also determine whether it is necessary to detect paging according to any one of the following:

pre-configured information, for example, the pre-configured information is the RRC signaling received by the terminal from the base station in advance, where the RRC signaling may indicate that in a case that the wake-up signal is not detected on the pre-configured resource, it is necessary to wake up and detect corresponding paging on the pre-configured resource; in some embodiments, the RRC signaling may indicate that in a case that the wake-up signal is not detected on the pre-configured resource, it is not necessary to wake up and detect the corresponding paging on the pre-configured resource; and a pre-defined rule, for example, the pre-defined rule is that in a case that the wake-up signal is not detected on the pre-configured resource, it is necessary to wake up and detect the corresponding paging on the pre-configured resource; in some embodiments, in a case that the wake-up signal is not detected on the pre-configured resource, it is not necessary to wake up and detect the paging.

Figure 2:
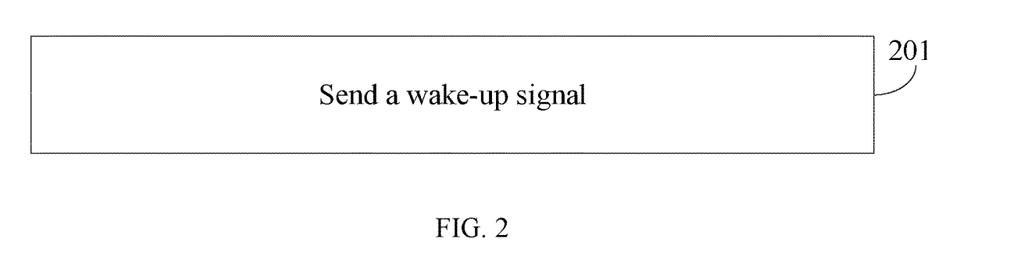
FIG. 2 is a flowchart of another resource indication method according to an embodiment of the present disclosure.

Referring to FIG. 2, FIG. 2 is a flowchart of a resource indication method according to an embodiment of the present disclosure. The method is applied to a communications device. As shown in FIG. 2, the method includes the following steps.

Step 201: Send a wake-up signal.

The wake-up signal is used to indicate configuration information of a target resource, and the target resource includes at least one of a measurement resource and a paging resource. An execution subject which is a communications devices in this embodiment may be a network device communicating with a terminal, for example, a base station, a terminal communicating with another terminal, or a certain type of network devices, which is not limited.

The resource indication method in this embodiment of the present disclosure may send the wake-up signal. The wake-up signal is used to indicate the configuration information of the target resource. The target resource includes at least one of the measurement resource and the paging resource. Therefore, the wake-up signal may be associated with the measurement resource and/or paging resource, thereby making the corresponding measurement and/or paging more efficient and energy-saving.

In some embodiments, the wake-up signal may be used to implicitly indicate that the target resource exists in the configuration information in a case that wake-up is indicated. In some embodiments, the wake-up signal may be used to implicitly indicate that the target resource does not exist in the configuration information in a case that wake-up is not indicated.

In some embodiments, the wake-up signal may be used for any one of the following:

indicating whether the target resource exists in the configuration information;

indicating that a resource indicated by a first measurement resource configuration is determined as the target resource; and indicating that the target resource exists in the configuration information, and the resource indicated by the first measurement resource configuration is determined as the target resource.

The first measurement resource configuration is one of a plurality of measurement resource configurations, and is indicated by the wake-up signal.

Figure 3:
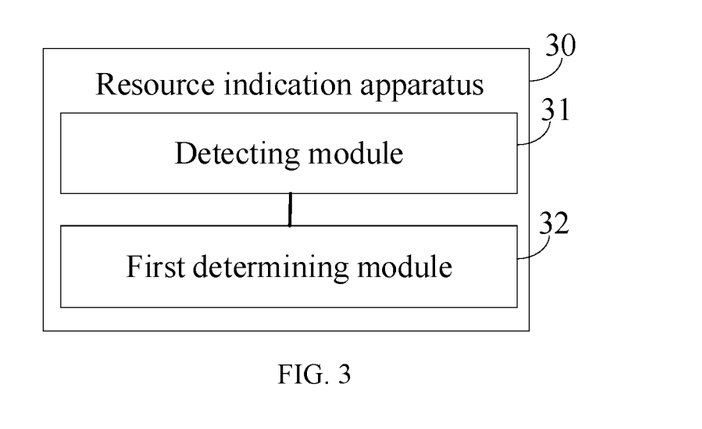
FIG. 3 is a first schematic structural diagram of a resource indication apparatus according to an embodiment of the present disclosure.

Referring to FIG. 3, FIG. 3 is a structural diagram of a resource indication apparatus according to an embodiment of the present disclosure. As shown in FIG. 3, the resource indication apparatus 30 includes:

a detecting module 31, configured to detect a wake-up signal; and a first determining module 32, configured to determine configuration information of a target resource based on the wake-up signal, where the target resource includes at least one of a measurement resource and a paging resource.

In some embodiments, the determining module 32 is configured to determine that in a case that the wake-up signal indicates wake-up, the target resource exists in the configuration information, or in a case that the wake-up signal does not indicate wake-up, determine that the target resource does not exist in the configuration information.

In some embodiments, the determining module 32 is configured for any one of the following:

based on the wake-up signal, determining whether the target resource exists in the configuration information;

based on the wake-up signal, determining a resource indicated by a first measurement resource configuration as the target resource; and based on the wake-up signal, determining that the target resource exists in the configuration information, and determining the resource indicated by the first measurement resource configuration as the target resource.

The first measurement resource configuration is one of a plurality of measurement resource configurations, and is indicated by the wake-up signal.

In some embodiments, the resource indication apparatus 30 includes:

a second determining module, configured to determine a pre-configured resource as the target resource in a case that the determined configuration information of the target resource is that the target resource exists in the configuration information.

In some embodiments, the resource indication apparatus 30 further includes:

an execution module, configured to perform measurement and/or paging on the target resource.

In some embodiments, the resource indication apparatus 30 further includes:

a third determining module, configured to determine the configuration information of the target resource based on any one of the following:

pre-configured information, and a pre-defined rule.

In some embodiments, the resource indication apparatus 30 further includes:

a fourth determining module, configured to determine whether it is necessary to detect paging based on any one of the following:

pre-configured information, and a pre-defined rule.

It may be understood that the resource indication apparatus 30 of this embodiment of the present disclosure can implement the processes implemented in the embodiment of the resource indication method shown in FIG. 1, with the same beneficial effects achieved. To avoid repetition, details are not described herein again.

Figure 4:
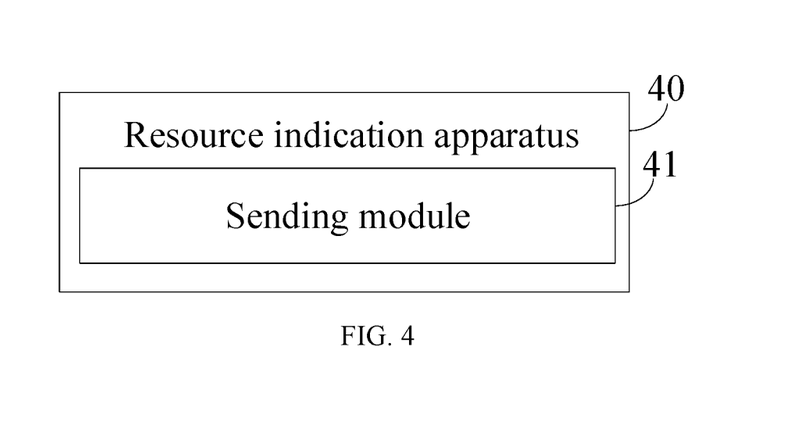
FIG. 4 is a second schematic structural diagram of a resource indication apparatus according to an embodiment of the present disclosure.

Referring to FIG. 4, FIG. 4 is a schematic structural diagram of a resource indication apparatus according to an embodiment of the present disclosure. As shown in FIG. 4, the resource indication apparatus 40 includes:

a sending module 41, configured to send a wake-up signal.

The wake-up signal is used to indicate configuration information of a target resource, and the target resource includes at least one of a measurement resource and a paging resource.

In some embodiments, the wake-up signal is used to implicitly indicate that the target resource exists in the configuration information in a case that wake-up is indicated. In some embodiments, the wake-up signal is used to implicitly indicate that the target resource does not exist in the configuration information in a case that wake-up is not indicated.

In some embodiments, the wake-up signal is used for any one of the following:

indicating whether the target resource exists in the configuration information;

indicating that a resource indicated by a first measurement resource configuration is determined as the target resource; and indicating that the target resource exists in the configuration information, and the resource indicated by the first measurement resource configuration is determined as the target resource.

The first measurement resource configuration is one of a plurality of measurement resource configurations, and is indicated by the wake-up signal.

It may be understood that the resource indication apparatus 40 of this embodiment of the present disclosure can implement the processes implemented in the method embodiment shown in FIG. 2, with the same beneficial effects achieved. To avoid repetition, details are not described herein again.

An embodiment of the present disclosure further provides a communications device, including a processor, a memory, and a computer program stored in the memory and capable of running on the processor, where when the computer program is executed by the processor, the processes in the foregoing embodiment of the resource indication method are implemented, with the same technical effect achieved. To avoid repetition, details are not described herein again.

Figure 5:
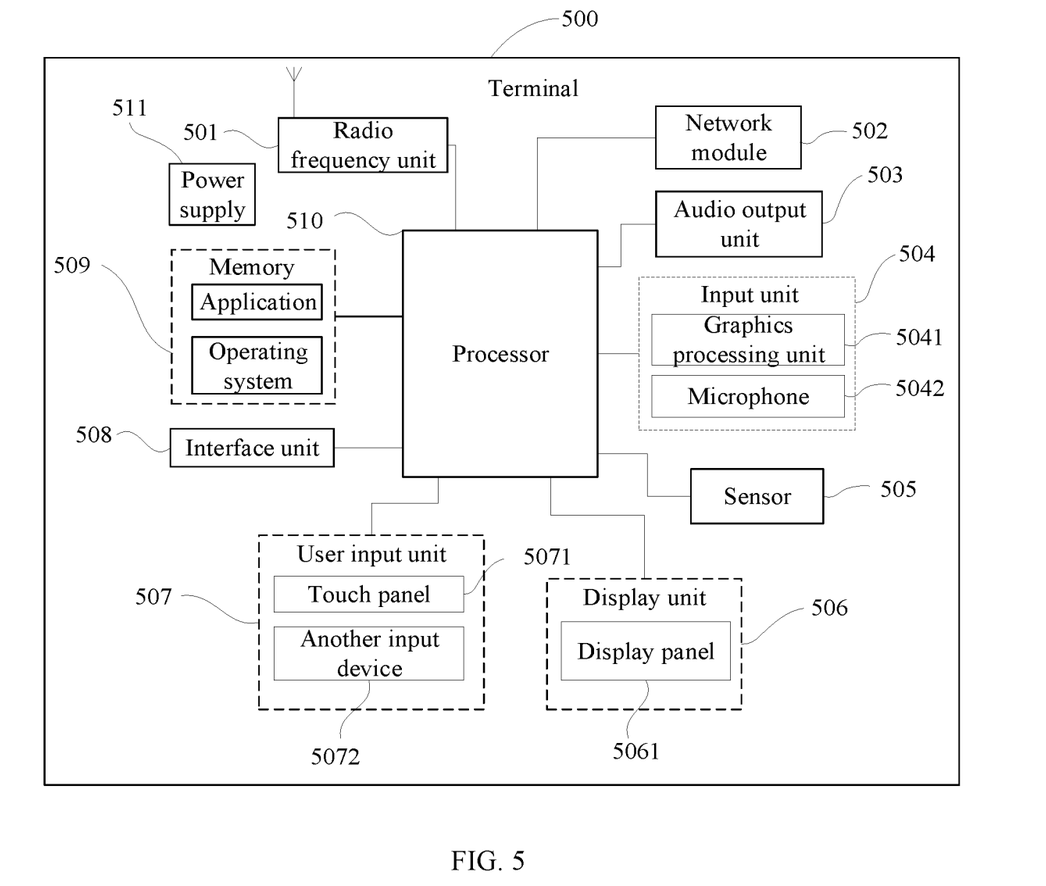
FIG. 5 is a schematic structural diagram of a terminal according to an embodiment of the present disclosure.

Referring to FIG. 5, FIG. 5 is a schematic diagram of a hardware structure of a terminal for implementing the embodiments of the present disclosure. The terminal 500 includes but is not limited to: components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art can understand that a structure of the terminal shown in FIG. 5 does not constitute a limitation on the terminal, where the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 510 is configured to detect a wake-up signal, and determine configuration information of a target resource based on the wake-up signal, where the target resource includes at least one of a measurement resource and a paging resource.

It should be understood that the terminal 500 of this embodiment of the present disclosure can implement the processes implemented in the method embodiment shown in FIG. 1, with the same beneficial effects achieved. To avoid repetition, details are not described herein again.

It should be understood that, in this embodiment of the present disclosure, the radio frequency unit 501 may be configured to receive and send information or a signal in a call process. In some embodiments, after receiving downlink data from a base station, the radio frequency unit 501 sends the downlink data to the processor 510 for processing. In addition, the radio frequency unit 501 sends uplink data to the base station. Usually, the radio frequency unit 501 includes but is not limited to an antenna, at least one amplifier, a transceiver, a coupler, a low noise amplifier, a duplexer, and the like. In addition, the radio frequency unit 501 may communicate with a network and another device through a wireless communication system.

The terminal provides wireless broadband Internet access to a user through the network module 502, for example, helps the user receive and send e-mails, browse web pages, access streaming media, and the like.

The audio output unit 503 may convert audio data received by the radio frequency unit 501 or the network module 502 or stored in the memory 509 into an audio signal and output the audio signal as a sound. In addition, the audio output unit 503 may further provide audio output (for example, a call signal receiving sound or a message receiving sound) related to a specific function performed by the terminal 500. The audio output unit 503 includes a speaker, a buzzer, a telephone receiver, and the like.

The input unit 504 is configured to receive an audio signal or a video signal. The input unit 504 may include a Graphics Processing Unit (GPU) 5041 and a microphone 5042. The graphics processing unit 5041 processes image data of a static picture or video obtained by an image capture apparatus (such as a camera) in a video capture mode or an image capture mode. A processed image frame may be displayed on the display unit 506. The image frame processed by the graphics processing unit 5041 may be stored in the memory 509 (or another storage medium) or transmitted by using the radio frequency unit 501 or the network module 502. The microphone 5042 may receive a sound and can process such sound into audio data. Processed audio data may be converted, in a call mode, into a format that can be sent to a mobile communication base station by using the radio frequency unit 501 for output.

The terminal 500 further includes at least one sensor 505, for example, a light sensor, a motion sensor, and another sensor. In some embodiments, the light sensor includes an ambient light sensor and a proximity sensor. The ambient light sensor may adjust luminance of the display panel 5061 based on brightness of ambient light. The proximity sensor may turn off the display panel 5061 and/or backlight when the terminal 500 is moved to an ear. As a type of the motion sensor, an accelerometer sensor can detect magnitude of acceleration in each direction (generally, on three axes), and may detect magnitude and a direction of gravity when being static. The accelerometer sensor may be used for recognizing a terminal gesture (for example, portrait and landscape orientation switching, a related game, or magnetometer posture calibration), a function related to vibration recognition (for example, a pedometer or a strike), or the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information entered by a user or information provided for a user. The display unit 506 may include the display panel 5061. The display panel 5061 may be configured in a form of a Liquid Crystal Display (LCD), an Organic Light-Emitting Diode (OLED), or the like.

The user input unit 507 may be configured to receive input digit or character information and generate key signal input related to user setting and function control of the terminal. In some embodiments, the user input unit 507 includes a touch panel 5071 and another input device 5072. The touch panel 5071 is also referred to as a touchscreen, and may collect a touch operation performed by a user on or near the touch panel 5071 (for example, an operation performed by a user on the touch panel 5071 or near the touch panel 5071 by using any proper object or accessory, for example, a finger or a stylus). The touch panel 5071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 510, and receives and executes a command sent by the processor 510. In addition, the touch panel 5071 may be implemented in various types such as a resistor, a capacitor, an infrared ray, or a surface acoustic wave. The user input unit 507 may include other input devices 5072 in addition to the touch panel 5071. In some embodiments, the another input device 5072 may include but is not limited to a physical keyboard, a functional button (such as a volume control button or a power on/off button), a trackball, a mouse, and a joystick. Details are not described herein.

Further, the touch panel 5071 may cover the display panel 5061. When detecting the touch operation on or near the touch panel 5071, the touch panel 5071 transmits the touch operation to the processor 510 to determine a type of a touch event, and then the processor 510 provides corresponding visual output on the display panel 5061 based on the type of the touch event. In FIG. 5, the touch panel 5071 and the display panel 5061 are used as two independent components to implement input and output functions of the terminal. However, in some embodiments, the touch panel 5071 and the display panel 5061 may be integrated to implement the input and output functions of the terminal. This is not specifically limited herein.

The interface unit 508 is an interface connecting an external apparatus to the terminal 500. For example, the external apparatus may include a wired or wireless headphone port, an external power supply (or a battery charger) port, a wired or wireless data port, a storage card port, a port used to connect to an apparatus having an identity module, an audio Input/Output (I/O) port, a video I/O port, a headset port, and the like. The interface unit 508 may be configured to receive input (for example, data information and power) from the external apparatus and transmit the received input to one or more elements in the terminal 500, or may be configured to transmit data between the terminal 500 and the external apparatus.

The memory 509 may be configured to store a software program and various data. The memory 509 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 509 may include a high-speed random access memory, and may further include a nonvolatile memory, for example, at least one magnetic disk storage device, a flash storage device, or another volatile solid-state storage device.

The processor 510 is a control center of the terminal, and connects all parts of the entire terminal by using various interfaces and lines. By running or executing a software program and/or a module stored in the memory 509 and invoking data stored in the memory 509, the processor performs various functions of the terminal and data processing, to perform overall monitoring on the terminal. The processor 510 may include one or more processing units. In some embodiments, the processor 510 may be integrated with an application processor and a modem processor. The application processor mainly processes an operating system, a user interface, an application program, and the like, and the modem processor mainly processes wireless communication. It can be understood that, in some embodiments, the modem processor may not be integrated into the processor 510.

The terminal 500 may further include a power supply 511 (such as a battery) that supplies power to each component. In some embodiments, the power supply 511 may be logically connected to the processor 510 by using a power management system, to implement functions such as charging, discharging, and power consumption management by using the power management system.

In addition, the terminal 500 may further include some function modules not shown, and details are not described herein.

Figure 6:
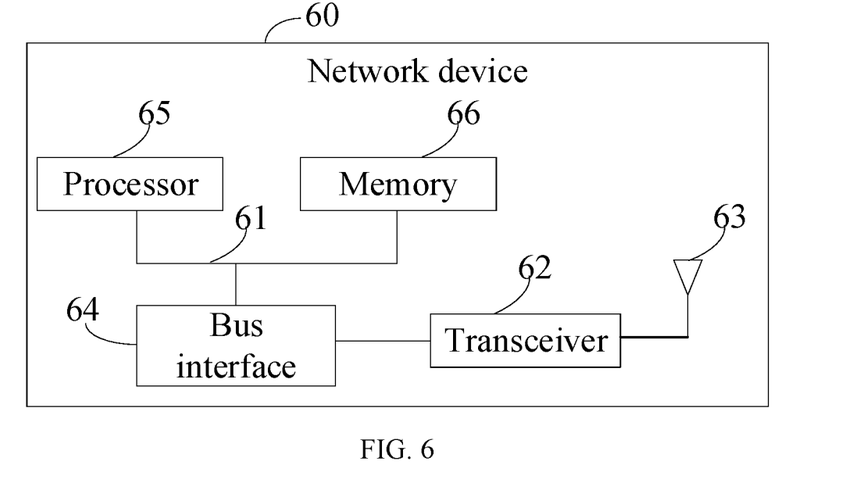
FIG. 6 is a schematic structural diagram of a network device according to an embodiment of the present disclosure.

Referring to FIG. 6, FIG. 6 is a schematic diagram of a hardware structure of a network device for implementing the embodiments of the present disclosure. The network device 60 includes but is not limited to a bus 61, a transceiver 62, an antenna 63, a bus interface 64, a processor 65, and a memory 66.

In this embodiment of the present disclosure, the network device 60 further includes a computer program that is stored in the memory 66 and that can be run on the processor 65, where when the computer program is executed by the processor 65, the following steps are implemented:

Send a wake-up signal, where the wake-up signal is used to indicate configuration information of a target resource, and the target resource includes at least one of a measurement resource and a paging resource.

The transceiver 62 is configured to receive and send data under the control of the processor 65.

The network device 60 provided according to the embodiments of the present disclosure may implement various processes implemented by the method embodiment shown in FIG. 2, and a same beneficial effect can be achieved. To avoid repetition, details are not described herein again.

In FIG. 6, for a bus architecture (represented by a bus 61), the bus 61 may include any quantity of interconnecting buses and bridges, and the bus 61 interconnects various circuits of one or more processors represented by the processor 65 and a memory represented by a memory 66. The bus 61 may further link together various other circuits, such as a peripheral device, a voltage regulator, and a power management circuit. The bus interface 64 provides an interface between the bus 61 and the transceiver 62. The transceiver 62 may be one component or may be multiple components, for example, multiple receivers and transmitters, and provide a unit that is configured to communicate with various other apparatuses on a transmission medium. Data processed by the processor 65 is transmitted on a wireless medium by using the antenna 63. Further, the antenna 63 further receives data and transmits the data to the processor 65.

The processor 65 is responsible for managing the bus 61 and general processing, and may further provide various functions, including timing, peripheral interfacing, voltage regulation, power management, and another control function. The memory 66 may be configured to store data used by the processor 65 when performing an operation.

In some embodiments, the processor 65 may be a CPU, an ASIC, an FPGA, or a CPLD.

An embodiment of the present disclosure further provides a computer-readable storage medium, where the computer-readable storage medium stores a computer program, and when the computer program is executed by a processor, the processes of the embodiment of foregoing resource indication method shown in FIG. 1 or FIG. 2 may be implemented, with the same technical effects achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A resource indication method, comprising:
    detecting, by a terminal, a wake-up signal; and
    determining, by the terminal, a resource indicated by a first measurement resource configuration as a target resource based on the wake-up signal,
    wherein the first measurement resource configuration comprises one of a plurality of measurement resource configurations notified to the terminal by using a Radio Resource Control (RRC) message, and is indicated by an indication field included in the wake-up signal, and wherein the target resource comprises a measurement resource, and the measurement resource comprises a measurement resource of a Channel State Information Reference Signal (CSI-RS) for performing a CSI-RS measurement.

2. The method according to claim 1, further comprising:
when the wake-up signal indicates wake-up, determining that the target resource exists in resources configured by the plurality of measurement resource configurations; or
when the wake-up signal does not indicate wake-up, determining that the target resource does not exist in the resources configured by the plurality of measurement resource configurations.

3. The method according to claim 1, wherein determining the resource indicated by the first measurement resource configuration as the target resource based on the wake-up signal comprises:
based on the wake-up signal, determining that the target resource exists in resources configured by the plurality of measurement resource configurations, and determining the resource indicated by the first measurement resource configuration as the target resource.

4. The method according to claim 1, further comprising:
performing measurement on the target resource.

5. The method according to claim 1, wherein when the wake-up signal is not detected on a pre-configured resource, the method further comprises:
determining configuration information of the target resource based on any one of the following:
pre-configured information; or
a pre-defined rule.

6. The method according to claim 1, wherein the target resource further comprises a paging resource and when the wake-up signal is not detected on a pre-configured resource, the method further comprises:
determining whether it is necessary to detect paging based on any one of the following:
pre-configured information; or
a pre-defined rule.

7. A resource indication method, comprising:
sending a wake-up signal to a terminal,
wherein an indication field included in the wake-up signal is used to indicate a first measurement resource configuration,
wherein the first measurement resource configuration comprises one of a plurality of measurement resource configurations notified to the terminal by using a Radio Resource Control (RRC) message,
wherein a resource indicated by the first measurement resource configuration is determined as a target resource, and the target resource comprises a measurement resource, and
wherein the measurement resource comprises a measurement resource of a Channel State Information Reference Signal (CSI-RS) for performing a CSI-RS measurement.

8. The method according to claim 7, wherein the wake-up signal is used to implicitly indicate that the target resource exists in resources configured by the plurality of measurement resource configurations when wake-up is indicated; or
the wake-up signal is used to implicitly indicate that the target resource does not exist in the resources configured by the plurality of measurement resource configurations when wake-up is not indicated.

9. A communications device, comprising:
a memory storing computer-readable instructions; and
a processor coupled to the memory and configured to execute the computer-readable instructions, wherein the computer-readable instructions, when executed by the processor, cause the processor to perform operations comprising:
detecting, by a terminal, a wake-up signal; and
determining, by the terminal, a resource indicated by a first measurement resource configuration as a target resource based on the wake-up signal,
wherein the first measurement resource configuration comprises one of a plurality of measurement resource configurations notified to the terminal by using a Radio Resource Control (RRC) message, and is indicated by an indication field included in the wake-up signal, and
wherein the target resource comprises a measurement resource, and the measurement resource comprises a measurement resource of a Channel State Information Reference Signal (CSI-RS) for performing a CSI-RS measurement.

10. The communications device according to claim 9, wherein the operations further comprise:
when the wake-up signal indicates wake-up, determining that the target resource exists in resources configured by the plurality of measurement resource configurations; or
when the wake-up signal does not indicate wake-up, determining that the target resource does not exist in the resources configured by the plurality of measurement resource configurations.

11. The communications device according to claim 9, wherein determining the resource indicated by the first measurement resource configuration as the target resource based on the wake-up signal comprises:
based on the wake-up signal, determining that the target resource exists in resources configured by the plurality of measurement resource configurations, and determining the resource indicated by the first measurement resource configuration as the target resource.

12. The communications device according to claim 9, wherein the operations further comprise:
performing measurement on the target resource.

13. The communications device according to claim 9, wherein when the wake-up signal is not detected on a pre-configured resource, the operations further comprise:
determining configuration information of the target resource based on any one of the following:
pre-configured information; or
a pre-defined rule.

14. The communications device according to claim 9, wherein the target resource further comprises a paging resource, and when the wake-up signal is not detected on a pre-configured resource, the operations further comprise:
determining whether it is necessary to detect paging based on any one of the following:
pre-configured information; or
a pre-defined rule.

15. The method according to claim 1, wherein the target resource further comprises a paging resource.

16. The method according to claim 15, further comprising:
performing paging on the target resource.

17. The method according to claim 1, wherein detecting, by the terminal, the wake-up signal comprises:

receiving, by the terminal, the wake-up signal from a base station by detecting a Physical Downlink Control CHannel (PDCCH).

18. The communications device according to claim 9, wherein detecting, by the terminal, the wake-up signal comprises:
receiving, by the terminal, the wake-up signal from a base station by detecting a Physical Downlink Control CHannel (PDCCH).

\* \* \* \* \*